US005788789A

United States Patent [19]
Cooper

[11] Patent Number: 5,788,789
[45] Date of Patent: Aug. 4, 1998

[54] POWER DEVICE FOR FUSING PLASTIC PIPE JOINTS

[75] Inventor: Kenneth Cooper, Westminster, Calif.

[73] Assignee: George Fischer Sloane, Inc., Little Rock, Ark.

[21] Appl. No.: 641,915

[22] Filed: May 2, 1996

Related U.S. Application Data

[60] Provisional application No. 60/000,027, Jun. 8, 1995.
[51] Int. Cl.⁶ .................................................. B32B 31/00
[52] U.S. Cl. .................. 156/64; 156/304.2; 156/304.6; 156/359; 156/378; 219/241; 219/485; 219/487; 219/494
[58] Field of Search .................................. 156/64, 304.2, 156/304.6, 359, 378; 219/240, 241, 482, 483, 484, 485, 487, 492, 494

[56] References Cited

U.S. PATENT DOCUMENTS

| | | |
|---|---|---|
| 3,465,126 | 9/1969 | Blumenkranz . |
| 4,015,145 | 3/1977 | Stewart . |
| 4,078,168 | 3/1978 | Kelly ........................... 219/497 |
| 4,243,875 | 1/1981 | Chang .......................... 219/497 |
| 4,288,271 | 9/1981 | Campbell, Jr. et al. ............ 156/359 |
| 4,571,488 | 2/1986 | Reeves . |
| 4,631,107 | 12/1986 | Ramsey . |
| 4,642,154 | 2/1987 | Thalman et al. . |
| 4,642,155 | 2/1987 | Ramsey ........................ 156/359 |
| 4,684,417 | 8/1987 | Grandclement ................. 156/64 |
| 4,695,335 | 9/1987 | Lyall ........................... 156/64 |
| 4,943,706 | 7/1990 | Lyall et al. . |
| 5,013,376 | 5/1991 | McElroy, II et al. ............ 156/64 |

FOREIGN PATENT DOCUMENTS

WO 8101118  4/1981  WIPO ........................ 156/64

OTHER PUBLICATIONS

PCT International Search Report, Oct. 1996.

*Primary Examiner*—David A. Simmons
*Assistant Examiner*—Paul M. Rivard
*Attorney, Agent, or Firm*—Finnegan, Henderson, Farabow, Garrett & Dunner L.L.P.

[57] ABSTRACT

A handheld power control device adapted to be connected to an external power supply for controlling the electric power applied to a heating coil positioned in a fusible area of a thermoplastic pipe joint for thermally fusing the joint. A housing having a cover with a front panel displays various parameters and operating options of the device, and has a plurality of manually operable membrane switches for selecting displayed options and activating the device, and indicating devices for displaying operating states of the device.

18 Claims, 7 Drawing Sheets

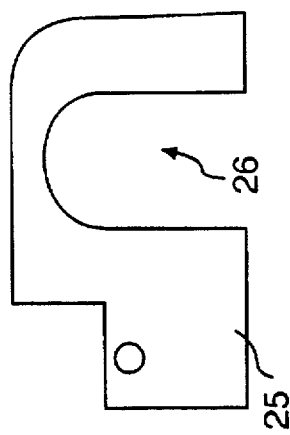
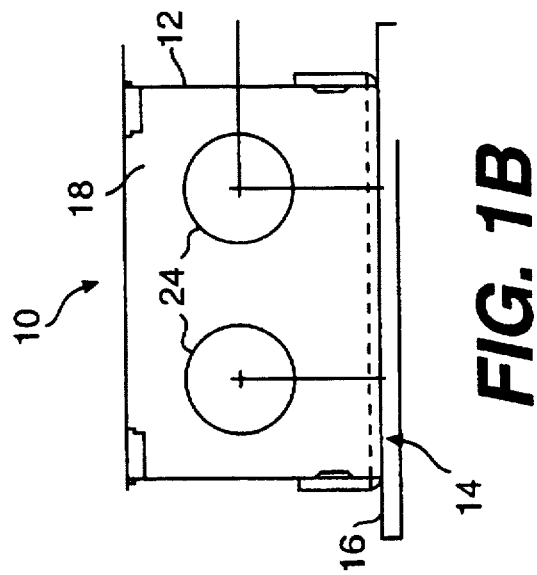
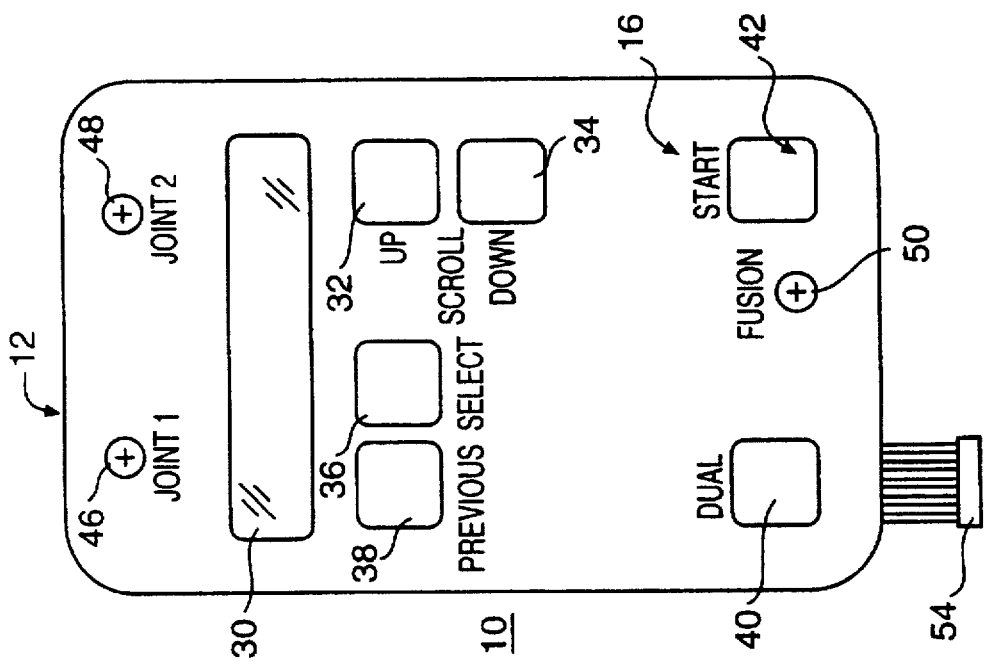

POWER DEVICE FOR FUSING PLASTIC PIPE JOINTS

This application claims the benefit of U.S. Provisional application entitled Power Control Apparatus and Method filed Jun. 8, 1995 and bears Ser. No. 60/000,027.

BACKGROUND OF INVENTION

1. Field of Invention

The present invention relates to the thermal welding of plastic pipe joints; and more particularly, to an apparatus and method for controlling the power used in the thermal welding of plastic pipe joints.

2. Description of Related Art

Pipe made of thermal plastic polymers, such as polypropylene, is now being used for many purposes that were previously confined to pipe constructed of metal or concrete. Because of the ability of thermal plastics to withstand corrosion, it's ease of handling, and minimal weight, for example, pipe made of such material is extensively used in both above and below ground applications. Typical uses for plastic pipe line are conduits for electrical conductors, water and sewer lines, and conduits for various pressurized and non-pressurized fluidic substances.

For the above applications, thermoplastic pipe must not only have a specified uniform minimal wall thickness to withstand a particular internal or external pressure, but the pipe joints must also be fluid tight and include such minimal wall thickness.

For many applications thermal welding is the preferred method of joining thermoplastic pipe and pipe joints. One of the methods used for the thermal welding of plastic pipes and fittings involves the use of a welding sleeve with an imbedded electric heating coil for fitting between the pipe and a socket as described in detail in U.S. Pat. No. 4,958,857 assigned to the same assignee as the instant application and incorporated herein. In this method, electric current is caused to pass through the embedded electric heating coil, and the resulting heat fuses the thermal plastic sleeve, fitting, and pipe. The AC power used in fusing the thermoplastic joints may be supplied by a portable electric generator driven by a gasoline engine, or standard commercially generated AC power.

If the joint receives too much power, the pipe will become too hot resulting in thermal degradation of the thermoplastic material. If the joint does not receive enough power, the pipe will not heat up sufficiently to make the proper bond between the pipe and the fitting. In both instances, the result is a substandard joint.

One apparatus for applying power to a thermoplastic pipe joint is described in U.S. Pat. No. 3,465,126. This apparatus is effective in fusing pipe joints, and has a feature for making it relatively easy for the pipe installer to adjust the voltage applied to the fusing coil to conform to the pipe size. However, with this apparatus, the accuracy of the applied power is solely at the discretion of the operator, in that the operator is able to deviate from the desired setting by the inadvertent rotation of a dial. Also, a change in the voltage and frequency of the input power to the power control unit during fusing can change the power to the coil without notifying the operator. Additionally, in the event of a fault in the connection to or break in the heating coil, or a component failing, because it exceeded its rated temperature, the operator would think that the control unit had completed a normal fusion cycle unless he or she was actually measuring the fusion time. Previously proposed power control units had an indicator that turned green when a previous fusion is completed signifying that the apparatus is ready for fusing another joint. At times, this resulted in the same joint inadvertently being fused more than once, particularly after a pause in the routine, such as after a coffee break, lunch, or the end of the workday, for example. Finally, this power control apparatus was relatively large and weighed approximately thirty-four pounds, making it burdensome to carry, and inconvenient at times to place the apparatus near the pipe joints being fused.

Previous power control units operated in such a way that a substandard joint was not detected until it could be destructively tested. This, of course, necessitated the disassembly and reassembly of defective joints, which were then retested. Such a testing procedure is expensive and time consuming.

In light of the foregoing there is a need to provide a power control apparatus for fusing thermoplastic pipe that overcomes one or more drawbacks of the prior power control units.

SUMMARY OF THE INVENTION

Accordingly, the present invention is directed to an apparatus and method for fusing thermoplastic pipe joints that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described herein, the hand held power control device of this invention comprises a housing, an input terminal accessible through the housing for connection to an AC voltage source, at least one output terminal accessible through the housing for connection to the at least one heating coil, a control element mounted in the housing and connected between the input terminal and the at least one output terminal for controlling the duration and level of the electric fusion power applied to the at least one heating coil, a microprocessor mounted in the housing for processing input signals applied to the microprocessor including variances therein and having an output connected to the control element for applying control signals to the control element to control the duration and level of electric fusion power applied to the at least one heating coil, a sensor circuit mounted in the housing and having an input coupled between the at least one output terminal and the control element, and having an output coupled as a sensor input signal to the microprocessor, the sensor circuit sensing at least one of voltage and current applied to the at least one heating coil, a visual display mounted to the housing and connected to the microprocessor for displaying each of a plurality of pipe joint sizes, and a manually operable switch mounted to the housing for selecting parameters corresponding to the displayed pipe joint size, the parameters being applied as parameter input signals to the microprocessor.

In another aspect, the present invention is a method of electrically fusing a joint of a thermoplastic pipe having a fusion coil surrounding a portion of the pipe joint to be fused, comprising the steps of removably coupling a source of AC power to the fusion coil for heating the fusion coil in response to the application of the coupled AC power, controlling by a microprocessor the voltage and current values and duration of the coupled AC power applied to the fusion coil by a control element, in accordance with a pipe diameter of the joint to be fused, indicating to an operator a proper coupling of the AC power source to the fusion coil, detecting by at least one sensor at least one of the voltage value, current value, and frequency of the AC power applied to the coil for the fusion duration of the fusion of the pipe joint, discontinuing the application of AC power to the fusion coil and displaying a fault message in a display in response to a pre-selected deviation from at least one of the detected controlled voltage value, current value, and frequency of the coupled AC power prior to completion of the controlled duration of the fusion, discontinuing the application of AC power to the fusion coil and indicating in the display successful completion of the fusion in the absence of the pre-selected deviation during the controlled duration of the fusion.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

FIG. 1A is a front view of the hand-held power control device of the present invention;

FIG. 1B is a top view of the device of FIG. 1A;

FIG. 1C is a bottom view of the device of FIG. 1A;

DESCRIPTION OF THE PREFERRED EMBODIMENT

Figure 2:
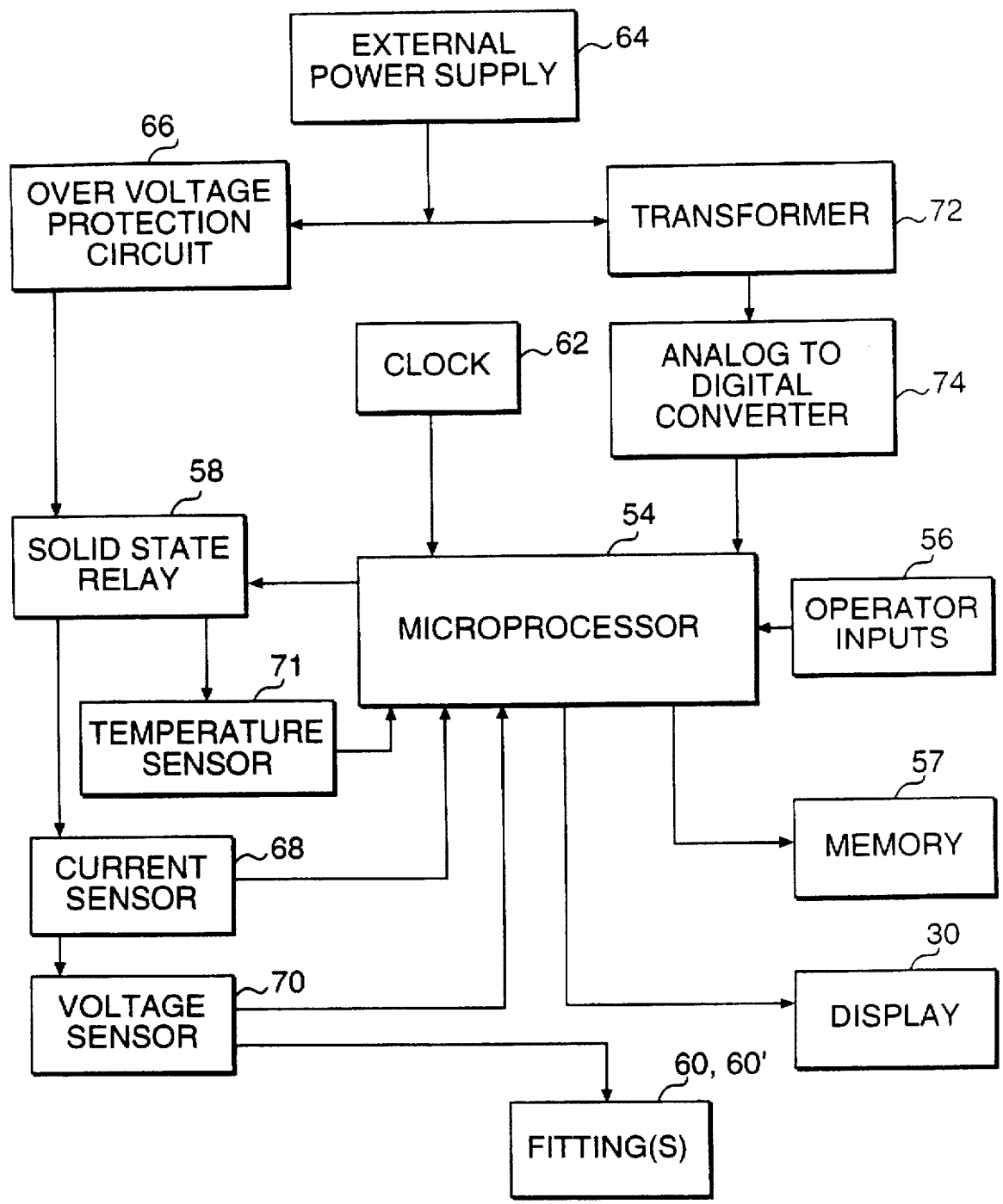
FIG. 2 is block diagram of the power control device of FIG. 1A-1C in accordance with the present invention.

The present invention is a handheld power control device adapted to be connected to an external power supply for controlling the electric power applied to a heating coil positioned in a fusible area of a thermoplastic pipe joint for thermally fusing the joint. The device comprises a housing having a cover with a front panel containing a display area for displaying various parameters and operating options of the device, a plurality of manually operable membrane switches for selecting displayed options and activating the device, and indicating devices for indicating the operating states of the device.

Reference will now be made in detail to the present preferred embodiment of the invention, an example of which is shown in the accompanying drawings, wherein like reference numerals refer to like parts throughout the several drawings, wherever possible.

As herein embodied and referring to FIGS. 1A-1C, a power control device 10 comprises a housing 12 having a cover 14 with a front membrane switch panel 16. The housing 12 contains an aluminum heat sink, an analog circuit board 20 (FIG. 3), and a digital circuit board 22 (FIG. 4). A top 18 of the housing 12 has a pair of openings 24 through which extend output lines (not shown) for connecting to heating or fusion coils which fuse the pipe joints. A bottom 25 of the housing 12 has a U-shaped recess 26 through which a cable (not shown) extends for connecting to an external power source. The device 10 is adapted to be hand held, and in accordance with one actual implementation measures approximately seven and one-half inches in length and approximately three and one-half inches in width and depth, and weighs about six pounds.

The front panel 16 has a liquid crystal display 30, and a plurality of manually operable membrane switches that constitute operator inputs or a keyboard for operating the device 10. Switches 32 and 34 scroll different pipe sizes, types of fittings, and "Normal" and "Cold" for display in the display 30. Switch 36 is operated to select a displayed parameter or pipe size, type of fitting to be used for thermally fusing the pipe joint, and for selecting the Normal mode when the ambient temperature is between forty degrees and one hundred ten degrees Fahrenheit, and for selecting the Cold mode when the ambient temperature is between zero and forty degrees Fahrenheit. In one actual implementation of the invention, the operator could select a pipe size from one-half to two inches in diameter for conveying a fluid under pressure to use with a type of fitting where a fusion coil surrounded the pipe joint, or a pipe size from one and one-half inches to twelve inches in diameter for carrying liquid not under pressure. The joint includes an annular plastic fitting having an embedded coil, for example. Switch 38 (Previous) is operated to back up to "Select From The Menu" options. A switch 40 is operated for placing the power unit in the single mode for fusing only one pipe joint; and a switch 42 is operated to begin actual fusing. An indicator light 50 is red during a fusion cycle. Lights 46, 48 are green before and during a fusion cycle, and turn red upon completion of a fusion cycle. However, the apparatus will not indicate that it is ready to fuse another joint until the output connectors are disconnected from the heating coil and then reattached, which makes it more difficult to accidentally again fuse the same joint. Indicator light 46 indicates that the device is connected for fusing in a single joint mode, and indicator light 48 indicates that the device is connected for fusing two joints simultaneously. The device 10 automatically supplies the correct amount of power regardless of whether one joint or two joints are being fused without any selection by the operator. A terminal 54 is located in bottom 25 of the housing 12 for connection to an RS-232 input of a conventional computer for logging data relating to the particular parameters that were existent in fusing specific pipe joints. This feature provides joint quality assessment without subjecting the joint to destructive testing. The device 10 also includes audible indications of deviations from the proper input voltage and frequency, output power, output volts, and temperature of critical component.

In accordance with the present invention, the power control unit includes a microprocessor, an operator input device, a display, a memory, a terminal for connection to an external power supply, an over voltage protection circuit, a solid state relay, a temperature sensor, a current sensor, a voltage sensor, means for connecting the device to a pipe fitting, a clock, an analog to digital converter, and a transformer.

As embodied herein and referring to FIG. 2, microprocessor 54 is programmed to respond to operator inputs as indicated at block 56, which block represents collectively the previously described membrane switches 32, 34, 36, 38, 40, and 42, and control information that is displayed in the display 30 and output to a memory 57 for data logging. The programmed microprocessor 54 also controls the operation of a solid state relay 58, which turns on and off the output power to one or more pipe joint fittings 60 connected to outputs 24 of the device. A clock 62 controls the timing of the microprocessor 54. An AC power supply 64 is connected to supply power to the fitting or fusion coil 60 through the solid state relay 58 and an over voltage protection circuit 66. The output power to the fitting 60 is monitored by a current sensor 68 and a voltage sensor 70, which are input to the microprocessor 54. The temperature of the solid state relay 58 is also monitored and transmitted to the microprocessor by a temperature sensor 71. The external power supply 64 is also used for providing the power to operate the microprocessor chip 54 through a transformer 72 and a circuit (not shown), which reduces the AC input voltage to five volts DC. An analog to digital converter monitors the DC signal and converts it to digital data for reading by the microprocessor 54.

Figure 3:
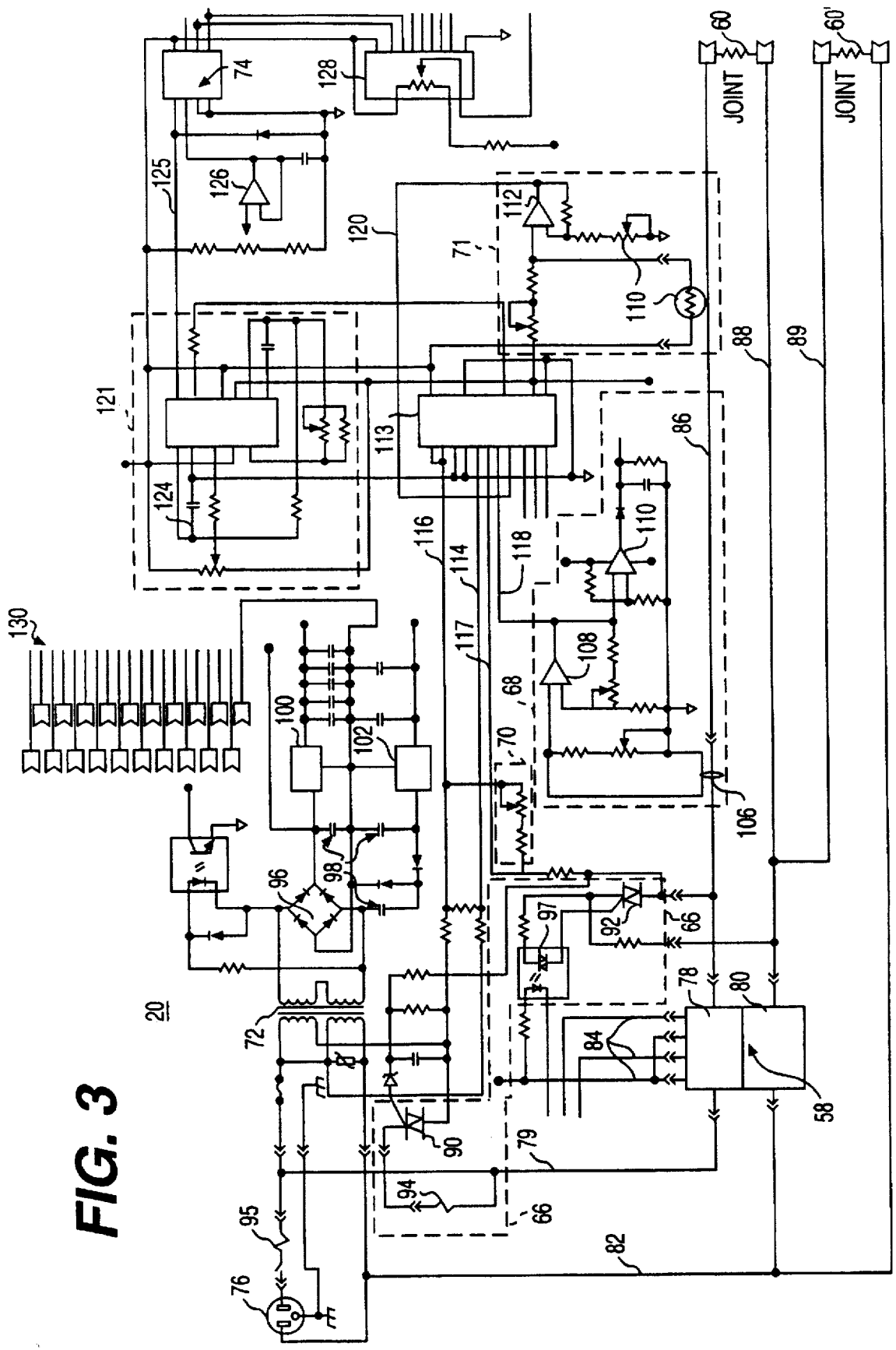
FIG. 3 is a schematic diagram of the analog circuit board of the power control device of FIG. 1A-1C.
Figure 4:
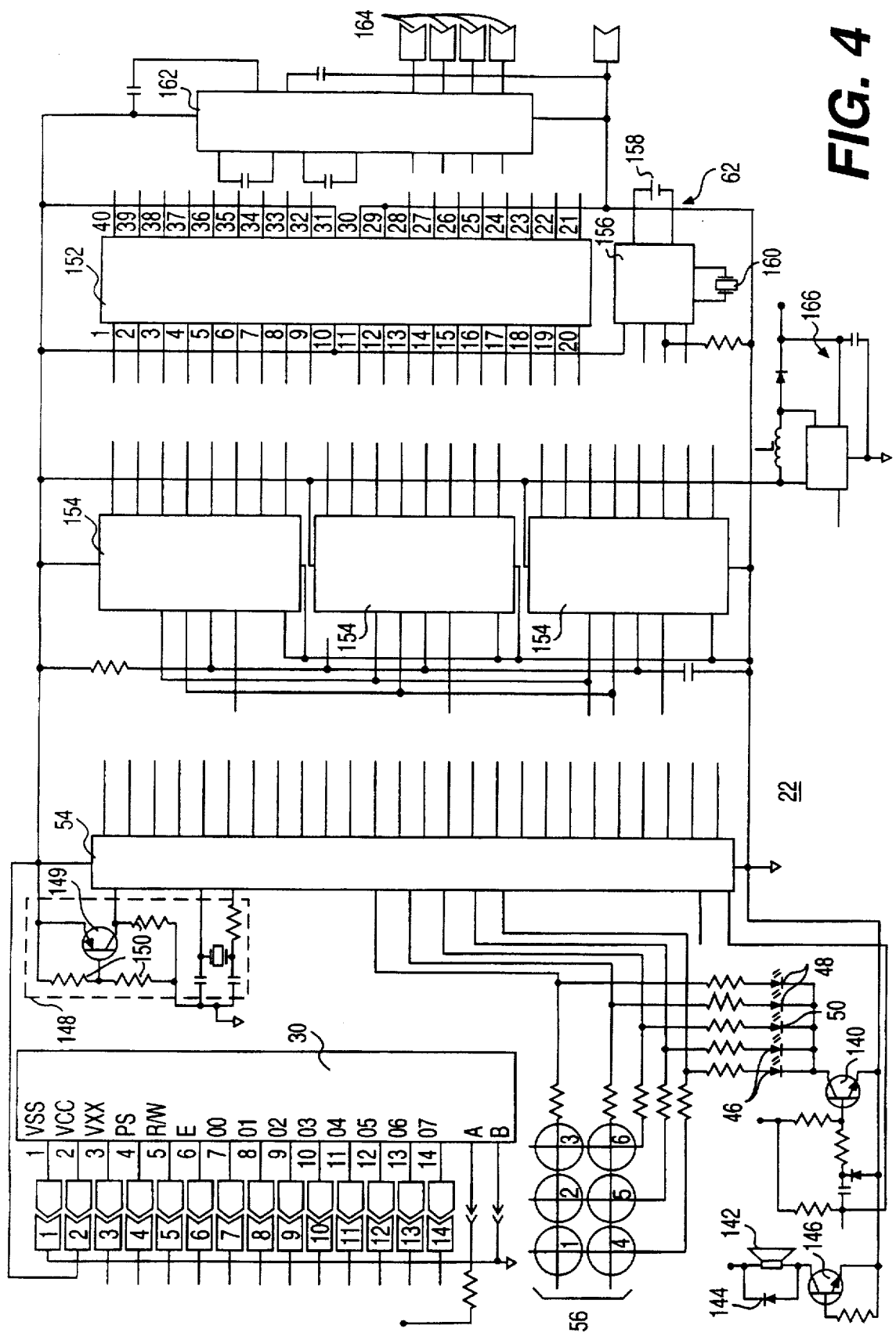
FIG. 4 is a schematic diagram of the digital circuit board of the power control device of FIG. 1A-1C.

As embodied herein and referring to FIG. 3, the analog circuit board 20 has an input plug or terminal 76 for connection to the external power supply 64. The solid state relay 58, which is preferably a dual forty ampere non-zero crossing solid state relay, has a side 78 connected to the terminal 76 over line 79 and a side 80 connected to the terminal 76 over line 82. The side 78 provides power to fitting or fusion coil(s) 60, 60' under precise phase control at inputs 84 from the microprocessor 54. When both the fusion coils 60 and 60' are properly connected, they are connected in series in a circuit that includes line 86, fusion coils 60, line 88, line 89, fusion coil, 60', and line 82 to the terminal 76. The side 80 of the relay 58 completes the current path when only a single fusion coil 60 is connected to the unit. The circuit for connecting only fusion coil 60 to the terminal 76 extends from line 79, side 78 of the relay, line 86, coil 60, line 88, side 80 of the relay and line 82 to the terminal 76.

An over voltage protection circuit 66 is an independent circuit that monitors the voltage across the fusion coils of the joint or joints. The overvoltage protection circuit includes an energizing coil 94 of a circuit breaker 95, a Triac 90 and a Triac 92, and an opto-isolator 97 that serves as a Triac Driver. In response to a high line voltage at terminal 76, with the relay 58 open, the Triac 90 fires, which energizes the voltage coil 94 of a circuit breaker 95 causing it to trip, thus disconnecting the relay 58 from the power source 64. When the relay 58 is closed and fusion coil 60 or 60 and 60' are connected, the driver 97 energizes the Triac 92. In response to an overvoltage at an input 84 from the microcontroller 54 or the output of the relay 58, the Triac 92 fires which in turn fires the Triac 90 to energize coil 94 of circuit breaker 95, disconnecting the input line from the power source 64 via terminal 76.

The transformer 72, which was previously mentioned in connection with FIG. 2, outputs to a full wave rectifier 96. The output voltage is smoothed by a plurality of capacitor filters 98. A voltage regulator 100 produces a positive voltage of five volts and 400 milliamps for powering the microprocessor chip 54, and a voltage regulator 102 produces negative five volts at 50 milliamps. An optoisolator 104 detects the zero crossings of the stepped down input power from the transformer 72 thus detecting the phase of the input power, which is output to the microprocessor 54 for controlling the output of the solid state relay 58. The current sensor 68 is an isolated circuit shown within the dashed lines of FIG. 3, and includes an inductor 106 which senses the current in the AC line 86 connected to the fusion coil of the joint. Operational amplifiers 108 and 110 are connected to the output of the inductor 106 to convert the induced signal to a range of from zero to two an one-half volts AC true root mean squared. The voltage sensor within the dashed lines 70 is a voltage divider that converts the voltage at the output of the solid state relay 58 and connected to the fusion coil(s) 60, 60' from the range of zero to fifty-one volts AC to a range of from zero to two and one-half volts AC true root mean squared for input to the microprocessor 54. The temperature sensor 71 includes transducers or temperature gauges 110 that measure the temperature at the solid state relay 58, and an operational amplifier 112 which converts degrees Centigrade to volts. The temperature range of zero to two hundred fifty degrees C. is converted to zero to twenty-five volts DC for applying to the microprocessor 54.

The sensed input voltage, the sensed output or fusion coil voltage and current, and the sensed temperature of the solid state relay are all input to an analog multiplexer 113. The sensed line or input voltage from circuit 66 is connected to inputs 114 and 116. The sensed output voltage is connected to input 117, the sensed current to input 118, and the sensed temperature to input 120. The multiplexer 113 multiplexes the signals for reading into an AC to DC true root mean square converter apparatus 121. The converter 121, which includes a filter cap 124, reads the AC signal and converts it to a DC voltage equal to the true root mean square value of the AC signal. The analog to digital converter 74 reads the DC signal from the true RMS converter 121 input at line 125 and in conjunction with the operational amplifier 126 converts the DC signal to digital data. The digital data is input to the microprocessor 54. A digital potentiometer 128 is connected to the line voltage sensor circuit 66, the coil voltage sensor circuit 70, the coil current sensor circuit 68, and the liquid crystal display circuit (not shown) to permit calibration of or adjustment of system parameters by means of membrane switch combinations without the necessity of removing the device cover 14. Interface 130 connects the five volt power supply and the digital signals to the digital circuit board 22.

In accordance with the present invention, the digital circuit board 22 includes a liquid crystal display, a microcontroller, an audible transducer circuit, a plurality of Bi-color light emitting diodes (LED), a red LED, a matrix keypad, a flash memory, timekeeping chip, RS-232 converter and port connector, and a voltage regulator.

As herein embodied and referring to FIG. 4, the digital circuit board 22 comprises the liquid crystal display 30, which is preferably a sixteen character by two line liquid crystal display with backlight. The display 30 provides a descriptive visual output of all system parameters, status, and errors. LEDs 46 provide a visual indication as to whether or not a proper connection is made and the appropriate protocol followed for commencing a fusion cycle for a fusion coil connected to the joint 1 output. LEDs 48 provide a visual indication as to whether or not a proper connection is made and the appropriate protocol followed for commencing a fusion cycle for a fusion coil connected to the joint 2 output. The LED 50 provides red illumination during a fusion cycle.

The microcontroller 54 reads the digital inputs corresponding to the multiplexed values corresponding to the line voltage, fusion coil voltage, fusion coil current, and the temperature of the solid state relay directly from the analog to digital converter 74. All user inputs are from keyboard 56, which is directly connected to the microcontroller 54 via the printed circuit board 22. The outputs of the microcontroller 54 for controlling the solid state relay 58 are connected through the interface 130 directly to the inputs 84 of the relay 58. The outputs for displaying the information on the display 30 are connected directly to the LCD 30. A driver transistor 140, selectively enables the LEDs to provide multiple capability between the keypad 56 and the LEDs 46, 48, and 50. A circuit, which includes an audible transducer or horn 142, a back EMF diode 144, and a driver transistor 146, provides an audible signal to indicate to the operator completed fusions, error conditions, and membrane switch or keypad feedback. A circuit 148, which includes a signal transistor 149 and divider resistors 150 provides a system reset by resetting the microcontroller 54 at times when the microcontroller voltage drops below approximately 4.3 volts. This prevents the microcontroller from entering a corrupted state should a voltage brown out occur. An eight megabyte flash memory 152 is mounted in the board 22, which memory is used for data logging. Eight bit shift registers 154 expand the outputs of the microcontroller 54 to provide the necessary address and controls for outputting to the flash memory 152. The clock 62 of FIG. 2 is comprised of a timekeeping chip 156, a battery 158, and a crystal 160. It keeps track of current time and date, and also provides the timing for fusion cycles and fusion serialization.

An RS-232 converter 162 converts the microcontroller signals to RS-232 specified voltage levels for proper compatibility with a COM port of a PC computer. Reference numeral 164 denotes an external connector that physically connects the device 10 to a COM port of a personal computer. A voltage regulator 166 is provided to insure a precise +12 voltage supply to the flash memory 152 via the shift registers 154.

Figure 7:
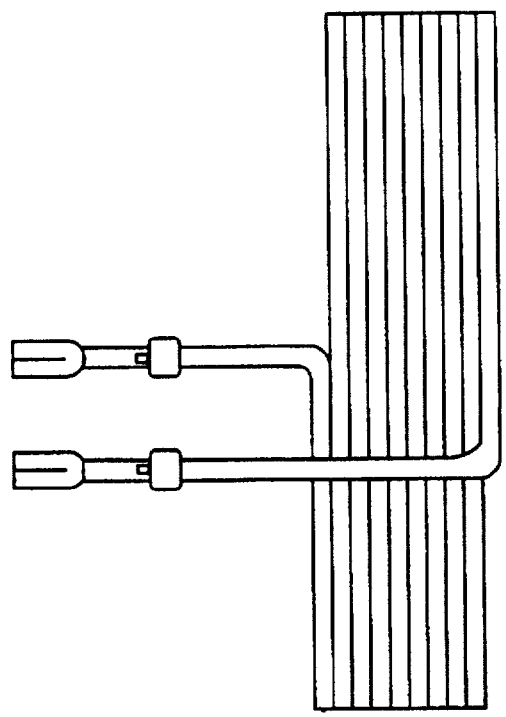
FIG. 7 is a view of a fusion coil used with the present invention.

According to one reduction to practice, the unit 10 is adapted to control the power for fusing unpressurized drain pipe joints for pipe sizes ranging from one and one-half inches in diameter to twelve inches in diameter. Joints of this type use coils similar to that shown in FIG. 7. Each coil, which is embedded in a thermoplastic sleeve or fitting, has an electrical resistance in a range that corresponds to the diameter of the pipe which the coil surrounds. For example, for non-pressurized joints having a diameter of from eight to twelve inches, the coils have a resistance in the range of from 0.71 to 0.73 ohms. Each size below eight inches has a different resistance. For example, a six inch coil exhibits 1.46 to 1.58 ohms, a four inch coil exhibits 0.94 to 1.02 ohms, a three inch coil exhibits 0.67 to 0.73 ohms, a two inch coil exhibits 0.30 to 0.32 oms, and a one and one-half inch coil exhibits 0.25 to 0.27 ohms.

The apparatus of the present invention controls the duration of the fusion cycle in accordance with the temperature limits of the pipe joint, which is usually ambient temperature. For example, in one actual reduction to practice, the duration of the fusion cycle depends on whether or not the temperature is above or below forty degrees F. For temperatures above forty degrees, the duration of the cycle for pipe sizes up to three inches is ninety seconds, for four inch pipe one hundred seconds, for six inch pipe one hundred ninety seconds, for eight to ten inch pipe two hundred forty seconds, and for twelve inch pipe three hundred seconds. At temperatures less than forty degrees, the duration of the cycle is thirty seconds longer for pipe sizes up to three inches, forty seconds longer for four seconds, sixty seconds longer for six inches, seventy seconds longer for eight and ten inches, and ninety seconds longer for twelve inches. The power is the same irrespective of the temperature. The power for a single fusion ranges from seventy-three watts for one and one-half inch pipe to three hundred ninety five watts for twelve inch pipe. For fusing two joints simultaneously, the power ranges from one hundred forty watts for a one and one-half inch pipe to three hundred fifty-five watts for four inch pipe.

According to the one actual reduction to practice, the unit 10 is adapted to control the power for fusing pressurized pipe joints for pipe sizes ranging from one and one-half inches to two inches in diameter. Joints of this type use coils similar to that shown in FIG. 7. Each coil has an electrical resistance in a range that corresponds to the diameter of the pipe which the coil surrounds. For example, for pressurized joints having a diameter of two inches, the coils have a resistance in the range of from 0.48 to 0.51 ohms. Each size below two inches has a different resistance. For example, a one and one half inch coil exhibits 0.39 to 0.43 ohms, a one inch coil exhibits 0.28 to 0.31 ohms, a three quarter inch coil exhibits 0.22 to 0.23 ohms, a one-half inch coil exhibits 0.17 to 0.18 ohms.

For temperatures above forty degrees, the duration of the fusion cycle for pressurized pipe of the sizes through two inches is one hundred thirteen seconds. For temperatures below forty degrees, the duration is one hundred thirty-three degrees for sizes through one inch, and one hundred forty-three and one hundred fifty-three seconds for sizes one and one-half and two inches respectively.

The power applied to the coil of the pressurized pipe of the sizes described ranges from forty-four watts through one hundred three watts for a single fusion, and seventy-seven through one hundred ninety-nine watts for a dual fusion.

A more detailed description of the preferred embodiment of the invention will now be described in connection with its operation, with reference to the flow charts of FIGS. 5 & 6.

The operator first connects the desired non-pressure or pressure pipe joint fusion coil(s) to the terminal labeled joint 1, and also to the terminal joint 2 if the fusion is to be dual.

After turning the power switch to the ON position, the display 30 lights up and for approximately five seconds performs a self diagnostic test. After the self test is complete, the display reads "Select from Menu" and "Fuse pipe" as shown at block 200 of FIG. 5." The display then reads "use up/down switch to adjust contrast level" as shown at block 202. After following directions of the prompt, the operator presses the button referred to as "Previous" to backup again to the "Select from Menu" option. The display then reads at block 204 "Show Temperature", and the operator then presses the "Select"button to show the temperature of the unit, and displays the acceptable temperature range and the present temperature. When the operator presses the Previous button to again backup to the "Select from Menu" option, the display shows the actual line frequency as noted at block 206 of FIG. 5. Then in response to the operation of the Select button, the display shows the acceptable line frequency range and the actual frequency of the power supply. Similarly, the operator again goes to the "Select from Menu" option and the display shows line volts represented by block 208. After pressing the Select button again the display reads that the acceptable range of line voltage and also the present line voltage. Finally, after pressing the Previous button to backup again to the "Select from Menu" options, the display reads "fuse pipe" as shown at block 200. The operator then presses Select to activate the fuse pipe option, and the operator presses the Up or Down buttons to select either the Fuseal non-pressurized pipe option at block 210 or the PPRO-seal which is the pressurized pipe option at block 212. After selecting one of those two options as indicated at block 210 and 212 of FIG. 5, the operator then presses the up or down button 32 or 34 to select the cold temperature option when the display indicates that the temperature is below 40° Fahrenheit, or the normal temperature option when the display indicates that the temperature is above 40° Fahrenheit. The operator then presses the Up or Down button to display the various Fuseal pipe sizes if the non-pressurized joint was selected at 210. The operation could select any pipe size up to 12" as shown by block 213 of FIG. 5. The operator presses the Start button to begin the fusion process. In the event the operator had selected the PPRO-seal or pressure type of fitting, as indicated at block 212, then the operator could have selected one of the pipe joint sizes, ranging from ½ inch to 2 inches as shown at block 217 in FIG. 5.

Assuming that the selected pipe size is 2 inches, assuming after selection, the display reads "connect joint 1 Fuseal" and then "2" to connect the joint 1 power cable to the Fuseal fitting. Assuming only one joint is to be fused, the operator then presses the button 40 referred to as "Dual" to turn off the Dual fusion mode. If another 2 inch joint is to be fused simultaneously, the operator connects joint 2 to a 2 inch Fuseal fitting, and the unit is now ready to start the fusion process.

Figure 5:
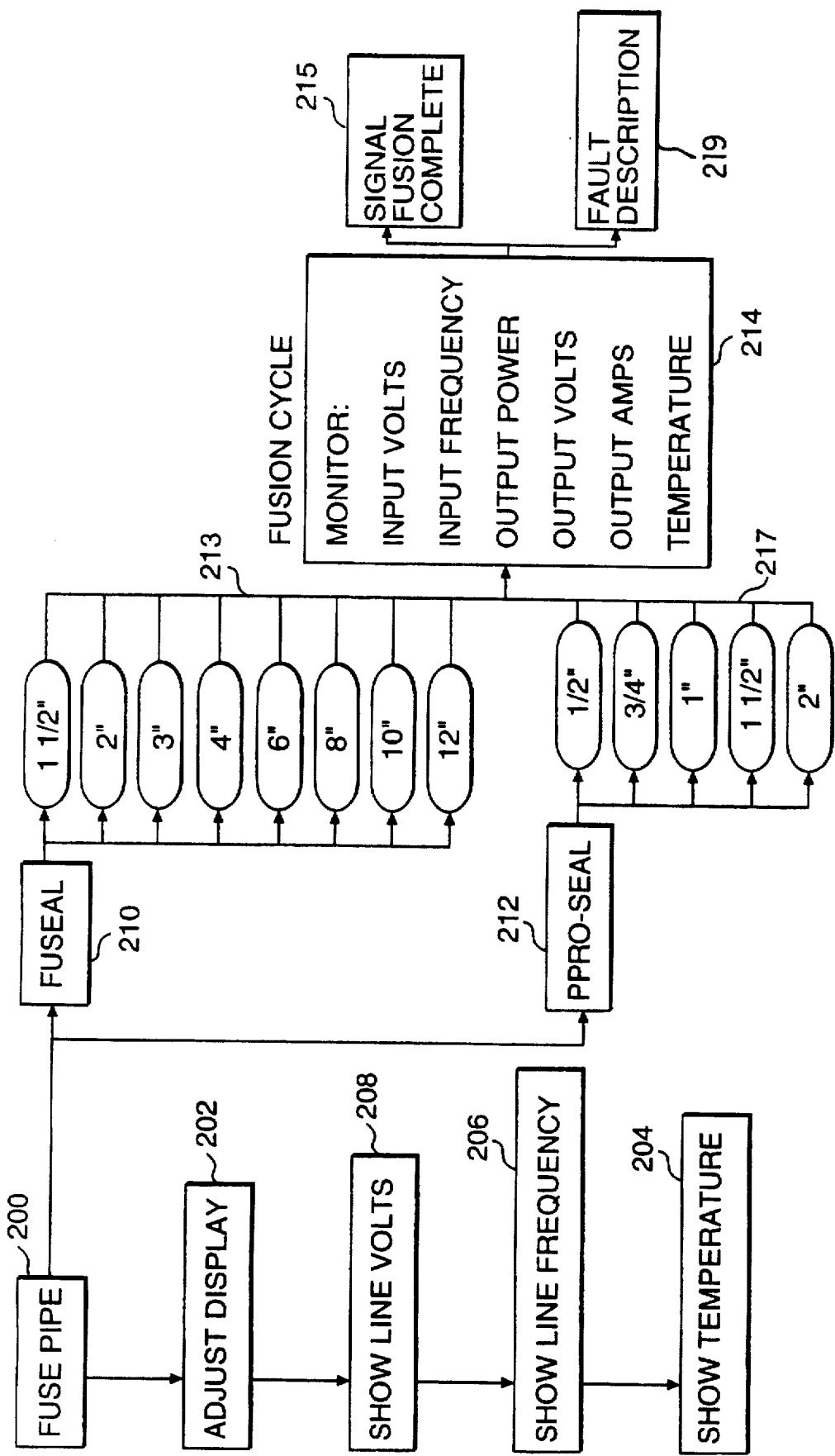
FIG. 5 is a flow chart illustrating the operational sequence of the power control device of FIG. 1A-1C.

During the fusion cycle, the device monitors the input volts, the input frequency, the output power, the output volts, the output amperage, and the temperature of the solid state relay as indicated at block 214 of FIG. 5. A particular input voltage and time duration for the fusion cycle depends upon the particular type of joint, either Fuseal or PPRO-seal, and the size of the pipe being fused, and whether a single joint or dual joint fusing as to occur. During the fusion cycle, the display 30 also displays the actual output voltage being applied to the coils, the frequency, the size of the pipe, the amperage, the wattage, and the resistance of the fusion coil. If all of these parameters are within a predetermined range the fusion cycle will run to its completion without any action on the part of the operator required. At the end of a normal fusion cycle, the display will read "Fusion complete" or "disconnect joint" as shown at block 215.

When this indication is displayed during a fusion cycle, the operator is directed to tighten the clamp without disturbing the joint. In the event the display should read "line voltage", in the fault description block of 219, the indication is that the input volts are less than 105 volts or greater than 135 volts. In such event, the operator should check the power supply. In the event the display reads "line frequency" the line frequency is less than 58 Hz or greater than 62 Hz. Here again the operator should check the power supply. If, during the fusion cycle the display reads "Coil detached" the current to the coil is less than 1 amp, and the operator should then determine whether or not the leads were detached during the fusion cycle and whether the coil still has continuity. If the display should read "Output voltage" it indicates that the voltage to the coil is greater than 45 volts. In such event, the operator should then try another fusion fitting or check the coil resistance. Should the display read "Output power" it means that the power to the coil is out of range, and the operator should check the power supply or determine whether or not the proper pipe size is selected. If the display should read "Power ramp time" the power to the coil is too low and the operator should check the power supply. Finally, if during the cycle the display reads "Overheated" the dual solid state relay is too hot, and should be permitted to cool before attempting another fusion.

Each time for a single fusion the operator should observe the joint 2 light. If it is on, the operator should press the dual button to turn it off. This tells the unit that only one joint is to be fused. If a fitting is connected to the joint 2 power cable, the operator will not be able to turn off the joint 2 light until the fitting is disconnected. Joint 2 is only used for dual fusions. A light above joint 1 will be red and the display will read "connect joint 1". When the joint 1 power output is connected to the fitting, the light above joint 1 will turn green if the cable is correctly connected. The display will then read "ready to fuse." For a dual fusion, the joint 1 and joint 2 should be connected to the fittings. Both fittings must be of the same coil size and once the joint 2 is connected, the unit will automatically detect the coil and be in the dual fusion mode. When both power output cables are correctly connected, the joint 1 and joint 2 lights will turn green. The display will read "Ready to fuse 2." At the completion of the fusing cycle, the display will so indicate at block 215 as previously mentioned, and the audible horn will sound calling the operators attention to the completion of the cycle. After a few seconds, the display will read "Disconnect joint 2." If other messages appear on the display as previously described, a fault has occurred which has terminated the fusion process.

Figure 6:
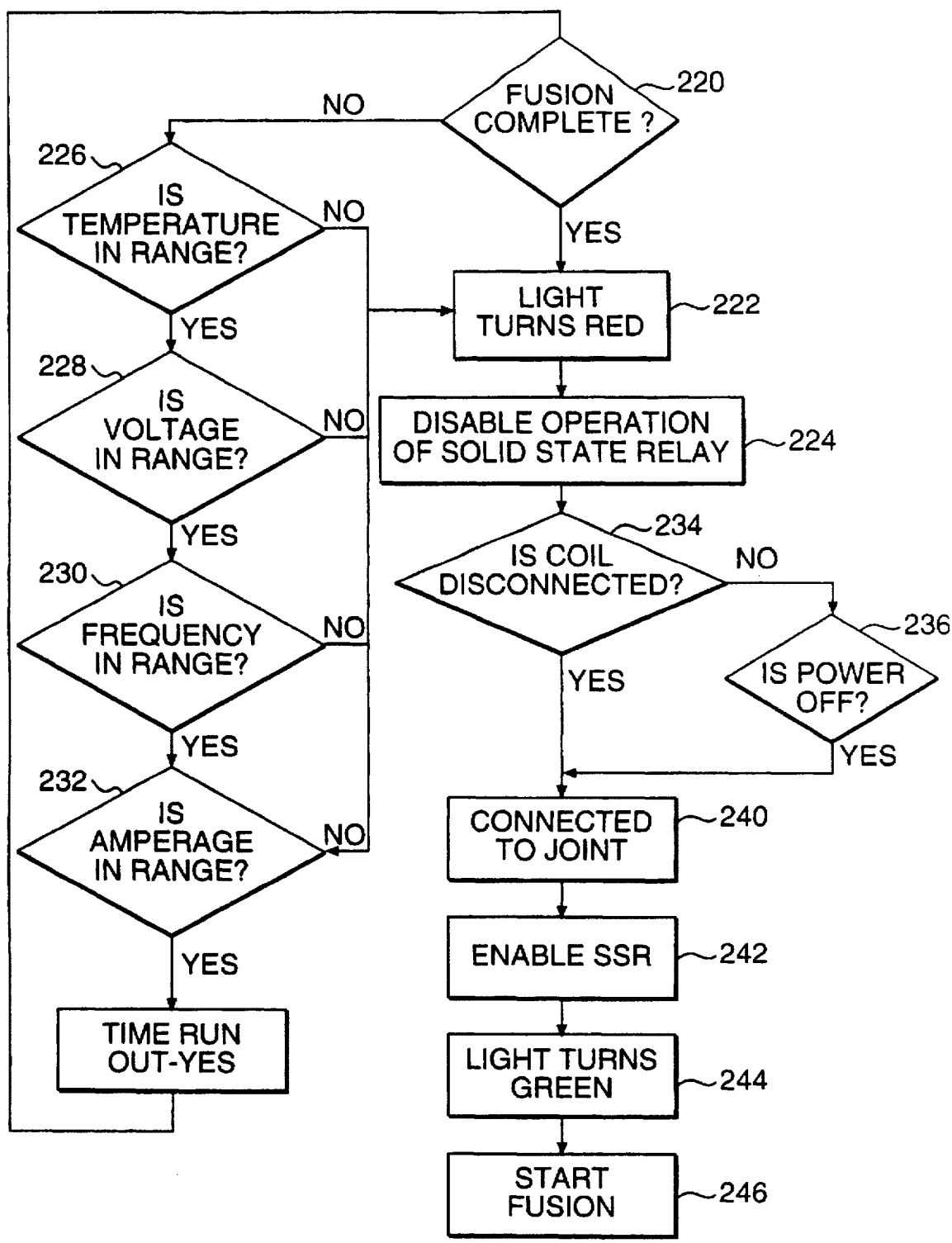
FIG. 6 is a flow chart illustrating the steps in readying the unit for fusing successive joints.

Referring to FIG. 6, when the fusion is complete as indicated at block 220, the light turns red at shown at block 222. Then the operation of the solid state relay 58 is disabled at block 224. In the event that the temperature is not in range as indicated by block 226, or the voltage is not in range as indicated at block 228, or that the frequency is not in range as indicated at block 230, or finally, that the amperage is not in range as indicated at block 232 and the time duration for the cycle has not run out, then the light 46, 48 will turn red at 222 and the operation of the solid state relay 58 will be disabled, shutting off power to the coil(s). If the coil is disconnected, as indicated at block 234, or, if the power is shut off as indicated at block 236, and the coil is properly connected to the output of the device as indicated at block 240, the solid state relay can again be enabled at block 242 and the light 46, 48 will turn green as indicated as block 244 making it possible to start a fusion cycle at block 246.

As described in connection with FIG. 4, the digital circuit board 22 contains an 8 meg flash memory 152 which records all significant data during the fusion operation. This process occurs in background mode, that is, the operator is not required to do any setup or installation to activate or operate this feature. After selecting "Send data log" from the menu display, the data exits at the RS-232 mini-din connector 54 located on the bottom of the unit 10 (FIG. 1) under a protective plastic cap (not shown). Normally the user would connect a data log cable into this connector and the other end into a com port on a PC. A software program can process (decode) the data and selectively develop concise reports on over one thousand of the last fusions that the unit has made. It is not necessary to have a custom software program to display the raw data that comes from the unit 10. A simple communications program that can import files externally is all that is required. The Windows program "Terminal" located in the "Accessory" box works well, and anybody who has Windows will have this program. Once the unit is connected to the PC com port and "Terminal" is setup and ready, press the Select button to begin sending the data log from the unit. The number of fusions made will determine the length of time required to send the data log. The maximum amount of time will be approximately thirty minutes. After the unit is finished, select "Stop" to terminate the receive file function. Now the raw data log file can be observed on any text editor.

Data may be displayed in two digit binary, hex, or decimal form with a space character as a delimiter. At the end of each 24 columns is a carriage return/line feed to begin a new line. The data log consists of a system header which contains system information, such as number of fusions made, number of fusion errors and their identity; a fusion header which contains fusion information, such as what type fusion (Fuseal/PProseal), size, wattage, scheduled fusion time and cold or normal setting; and fusion plot data, which contains plot data to plot detailed graphs for coil amps, coil voltage, line voltage, line frequency, temperature of solid state relay and failures(s) if any occurred.

It will be apparent to those skilled in the art that various modifications and variations can be made in the apparatus and method without departing from the spirit or scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A hand held power control device for controlling electric power applied to at least one heating coil for fusing a thermoplastic pipe joint, comprising a housing;

an input terminal accessible through the housing for connection to an AC voltage source;

at least one output terminal accessible through the housing for connection to the at least one heating coil;

a control element mounted in the housing and connected between the input terminal and the at least one output terminal for controlling the duration and level of the electric fusion power applied to the at least one heating coil;

a microprocessor mounted in the housing for processing input signals applied to the microprocessor including variances therein and having an output connected to the control element for applying control signals to the control element to control the duration and level of electric fusion power applied to the at least one heating coil;

a sensor circuit mounted in the housing and having an input coupled between the at least one output terminal and the control element, and having an output coupled as a sensor input signal to the microprocessor, said sensor circuit sensing at least one of voltage and current applied to the at least one heating coil;

a visual display mounted to the housing and connected to the microprocessor for displaying each of a plurality of pipe joint sizes; and a manually operable switch mounted to the housing for selecting parameters corresponding to the displayed pipe joint size, the parameters being applied as parameter input signals to the microprocessor.

2. The hand held power control device of claim 1, further comprising a second sensor circuit mounted in the housing and having an input coupled between the input terminal and the control element, and having an output coupled to an input of the microprocessor for varying the control signals in response to a variance in the AC power of the external power source.

3. The hand held power control device of claim 1, wherein said sensor circuit senses the frequency and current of the power applied to the heating coil, and applies the sensed current and frequency to the microprocessor.

4. The hand held power control device of claim 1, further comprising an indicator light mounted on the housing operable to display a first color for indicating that the device is connected to a heating coil and ready to begin a cycle for fusing the connected thermoplastic pipe joint, an indicating to display for indicating completion of the cycle for fusing said connected thermoplastic joint; and means including the microprocessor for causing said indicator light to repeat the display of the first color in response to a disconnection of the heating coil of the fused pipe joint from the at least one output terminal and a subsequent connection to another heating coil.

5. The hand held power control device of claim 1, wherein at least one output terminal comprises first and second output terminals for connection to respective first and second heating coils of different fusible joints, said first and second output terminals being coupled to the control element to connect the first and second heating coils in series upon connection of the second heating coil to the second output terminal.

6. The hand held power control device of claim 5, further comprising indicating lights mounted to the housing and operable to indicate a connection of a first heating coil to the first output terminal and operable to indicate a connection of a second heating coil to the second output terminal, and said switch selecting parameters in accordance with the connection of one or both of the output terminals to a respective heating coil.

7. The hand held power control device of claim 1 wherein the control element includes a non-zero crossing solid state relay responsive to control signals for outputting a selected portion of each wave of a sine wave of the AC input voltage to control the output power applied to the at least one output terminal.

8. The hand held power control device of claim 1 wherein the control element is a dual non-zero crossing solid state relay having a first portion for controlling the power applied to the output terminals and a second portion for completing the circuit when fusing one joint.

9. The hand held power control device of claim 1, further comprising means for indicating to the operator that coupling to a heating coil is permissible in response to the electrical disconnection of the power control device from the fused joint and subsequent connection of a fusion coil to the power control device.

10. A method of electrically fusing a joint of a thermoplastic pipe having a fusion coil surrounding a portion of the pipe joint to be fused, comprising the steps of removably coupling a source of AC power to the fusion coil for heating the fusion coil in response to the application of the coupled AC power;

controlling by a microprocessor the voltage and current values and duration of the coupled AC power applied to the fusion coil by a control element, in accordance with a pipe diameter of the joint to be fused;

indicating to an operator a proper coupling of the AC power source to the fusion coil;

detecting by at least one sensor at least one of the voltage value, current value, and frequency of the AC power applied to the fusion coil for the duration of the fusion of the pipe joint;

discontinuing the application of AC power to the fusion coil and displaying a fault message in a display in response to a pre-selected deviation from at least one of the detected controlled voltage value, current value, and frequency of the coupled AC power prior to completion of the controlled duration of the fusion; and discontinuing the application of AC power to the fusion coil and indicating in the display successful completion of the fusion in the absence of the pre-selected deviation during the controlled duration of the fusion.

11. The method of claim 10, further comprising sensing a variance in the AC power of the external power source; and varying control signals applied to the control element by the microprocessor in response to the sensed variance.

12. The method of claim 10, further comprising varying control signals applied to the control element by the microprocessor in accordance with the sensed current and frequency of the heating coil.

13. The method of claim 10, further comprising indicating that the device is connected to a fusion coil and ready to begin a cycle for fusing a connected thermoplastic pipe joint;

displaying completion of the cycle for fusing said connected thermoplastic joint; and repeating the the indicating step in response to a disconnection of the fusion coil of the fused pipe joint from the AC power and a subsequent connection of AC power to a fusion coil.

14. The method of claim 10, further comprising removably connecting a second fusion coil for fusing a second pipe joint in series with the fusion coil connected to the AC power source.

15. The method of claim 14, further comprising visually indicating a connection of the fusion coil to a first output terminal;

visually indicating a connection of the second fusion coil to a second output terminal; and selecting input parameters to the microprocessor in accordance with the connection of the first or both of the output terminals to a respective fusion coil.

16. The method of claim 10 wherein the control element includes a non-zero crossing solid state relay, said method comprising inputting to the solid state relay a selected portion of each wave of a sine wave of the AC power source in accordance with the power applied to the fusion coil.

17. The method of claim 14 wherein the control element includes a dual non-zero crossing solid state relay having a first and second portion, said method comprising controlling the first portion to apply the AC power to the fusion coil;

controlling the first portion to apply AC power also to the second fusion coil; and controlling the second portion to complete the circuit when fusing one pipe joint.

18. The method of claim 10, further comprising indicating that coupling to a fusion coil is permissible in response to the electrical disconnection of the AC power source from the fused joint and subsequent coupling of a fusion coil to the AC power source.

* * * * *